US008234407B2

(12) United States Patent
Sugumar et al.

(10) Patent No.: US 8,234,407 B2
(45) Date of Patent: Jul. 31, 2012

(54) NETWORK USE OF VIRTUAL ADDRESSES WITHOUT PINNING OR REGISTRATION

(75) Inventors: Rabin A. Sugumar, Sunnyvale, CA (US); Robert W. Wittosch, Duluth, GA (US); Bjørn Dag Johnsen, Oslo (NO); William M. Ortega, Lawrenceville, GA (US)

(73) Assignee: Oracle America, Inc., Redwood City, CA (US)

( * ) Notice: Subject to any disclaimer, the term of this patent is extended or adjusted under 35 U.S.C. 154(b) by 607 days.

(21) Appl. No.: 12/495,805

(22) Filed: Jun. 30, 2009

(65) Prior Publication Data
US 2010/0332789 A1 Dec. 30, 2010

(51) Int. Cl.
*G06F 15/16* (2006.01)
*G06F 13/36* (2006.01)
*G06F 12/00* (2006.01)

(52) U.S. Cl. ........ 709/245; 709/213; 709/216; 710/308; 710/310; 711/202; 711/206; 711/207; 711/E11.087; 711/E12.014; 711/E12.058; 711/E12.59; 711/E12.061

(58) Field of Classification Search .......... 709/245, 709/213, 216; 710/308, 310; 711/202, 206, 711/207, E11.087, E12.014, E12.058, E12.059, 711/E12.061
See application file for complete search history.

(56) References Cited

U.S. PATENT DOCUMENTS

| | | | |
|---|---|---|---|
| 5,448,698 A | 9/1995 | Wilkes | |
| 6,125,399 A | 9/2000 | Hamilton | |
| 6,629,207 B1 * | 9/2003 | Yoshioka et al. | 711/125 |
| 6,633,967 B1 * | 10/2003 | Duncan | 711/207 |
| 6,704,831 B1 * | 3/2004 | Avery | 710/310 |
| 7,042,876 B1 * | 5/2006 | Jayasenan et al. | 370/389 |
| 7,234,038 B1 * | 6/2007 | Durrant | 711/203 |
| 7,299,335 B2 * | 11/2007 | Moyer | 711/205 |
| 7,496,095 B1 | 2/2009 | Davis | |
| 7,500,049 B2 * | 3/2009 | Dixon et al. | 711/101 |
| 7,636,832 B2 * | 12/2009 | Raj et al. | 711/207 |
| 7,970,949 B2 * | 6/2011 | Pope et al. | 709/250 |

(Continued)

OTHER PUBLICATIONS

Fabrizio Petrini, Wu-Chun Feng, Adolfy Hoisie, Salvador Coll, and Eitan Frachtenberg; "The Quadrics Network: High-Performance Clustering Technology"; Los Alamos National Laboratory; IEEE Micro 22(1) Jan.-Feb. 2002; pp. 46-57.

(Continued)

*Primary Examiner* — Alina N. Boutah
(74) *Attorney, Agent, or Firm* — Meyertons Hood Kivlin Kowert & Goetzel, P.C.; Jeffrey C. Hood (57) ABSTRACT

A system comprising a compute node and coupled network adapter (NA) that allows the NA to directly use CPU virtual addresses without pinning pages in system memory. The NA performs memory accesses in response to requests from various sources. Each request source is assigned to context. Each context has a descriptor that controls the address translation performed by the NA. When the CPU wants to update translation information it sends a synchronization request to the NA that causes the NA to stop fetching a category of requests associated with the information update. The category may be requests associated with a context or a page address. Once the NA determines that all the fetched requests in the category have completed it notifies the CPU and the CPU performs the information update. Once the update is complete, the CPU clears the synchronization request and the NA starts fetching requests in the category.

19 Claims, 6 Drawing Sheets

U.S. PATENT DOCUMENTS

| | | | | |
|---|---|---|---|---|
| 2002/0156962 | A1* | 10/2002 | Chopra et al. | 711/3 |
| 2003/0023666 | A1 | 1/2003 | Conway et al. | |
| 2005/0188175 | A1* | 8/2005 | Chiang et al. | 711/206 |
| 2005/0216642 | A1* | 9/2005 | Lee | 710/308 |
| 2006/0164425 | A1* | 7/2006 | Parke | 345/565 |
| 2007/0016754 | A1* | 1/2007 | Testardi | 711/206 |
| 2007/0162683 | A1* | 7/2007 | Hattori et al. | 711/6 |
| 2008/0098147 | A1* | 4/2008 | Amano | 710/300 |
| 2008/0127203 | A1* | 5/2008 | Huang et al. | 719/313 |
| 2008/0189509 | A1* | 8/2008 | Lee | 711/208 |
| 2008/0244155 | A1* | 10/2008 | Lee et al. | 711/6 |
| 2009/0006805 | A1* | 1/2009 | Anderson et al. | 711/207 |
| 2009/0210650 | A1* | 8/2009 | Alexander et al. | 711/207 |
| 2010/0011188 | A1* | 1/2010 | Eddy et al. | 711/207 |
| 2010/0217951 | A1* | 8/2010 | Pan et al. | 711/206 |
| 2010/0318713 | A1* | 12/2010 | Deshpande | 710/308 |
| 2010/0332612 | A1* | 12/2010 | Johnsen et al. | 709/216 |
| 2010/0332908 | A1* | 12/2010 | Johnsen et al. | 714/39 |
| 2011/0103387 | A1* | 5/2011 | Jayasenan et al. | 370/392 |
| 2011/0173396 | A1* | 7/2011 | Sugumar et al. | 711/137 |

OTHER PUBLICATIONS

International Search Report and Written Opinion for Application No. PCT/US2010/026911, mailed Aug. 20, 2010; 15 pages.

Office Action for U.S. Appl. No. 12/402,804, mailed Sep. 20, 2010; 16 pages.

"InfiniBand Architecture Specification vol. 1, Release 1.2.1"; InfiniBand Trade Assocation; Nov. 2007; 1727 pages.

Michael L. Scott; "Shared Memory Models"; Workshop on Communication and Middleware for Parallel Programming Models; Apr. 2002; 29 pages.

Leonidas Kontothanassis, Robert Stets, Galen Hunt, Umit Rencuzogullari, Gautam Altekar, Sandhya Dwarkadas, and Michael L. Scott; "Shared Memory Computing on Clusters with Symmetric Multiprocessors and System Area Networks"; ACM Transactions on Computer Systems, vol. 23, Issue 3, Aug. 2005; 33 pages.

Yong Xiong, Jyh-Charn Liu, and Wei Zhao; "On the Smoothing of Traffic Flows Using On-Off Control"; Real-Time Systems Symposium, Work-in-Progress Session, Dec. 3, 2003; 3 pages.

* cited by examiner

CDT Entry Structure

FIG. 5

Synchronization Register

FIG. 6

Synchronization Status Register

NETWORK USE OF VIRTUAL ADDRESSES WITHOUT PINNING OR REGISTRATION

FIELD OF THE INVENTION

The present disclosure relates generally to clusters, and more particularly to a method for network adapters to directly use CPU virtual addresses without pinning pages in system memory.

DESCRIPTION OF THE RELATED ART

A cluster generally refers to a group of computers that have been linked or interconnected to operate closely together, such that in many respects they form a single computer. Large clusters can include thousands of individual computer systems that have been linked together. The components (e.g., individual computers or "compute nodes") of a cluster are often connected to each other through local area networks via network adapters. Clusters generally provide greatly improved performance and/or availability over that provided by a single computer. A cluster is also typically more cost-effective than a single computer of comparable speed or availability.

A cluster generally contains a plurality of compute nodes (e.g., servers) and the "interconnect" between these compute nodes. An important aspect to building large cluster systems is the interconnect. The interconnect may include a "fabric", e.g., the network that connects all of the servers together, as well as host adaptors that interface each of the computer systems (servers) to the fabric. One commonly used cluster interconnect is Ethernet. More recently, clusters have started using Infiniband as the interconnect. InfiniBand (IB) is a switched fabric communications link primarily used in high-performance computing and provides quality of service and failover features as well as scalability. An Infiniband interconnect generally provides lower latency, higher bandwidth, and improved reliability.

Many organizations such as research centers and national laboratories require large clusters with thousands of nodes to satisfy their compute requirements. It is very important to reduce the overhead of communication in such large clusters to allow applications to scale efficiently.

Compute nodes in a cluster may use various mechanisms for communication with other compute nodes in the cluster. For example, compute nodes may use a protocol referred to as Message Passing Interface (MPI) for data communication. Compute nodes may also use Remote Direct Memory Access (RDMA). Further, compute nodes may use CPU loads and stores to perform data communication.

RDMA allows data to be moved directly from the memory of one computer to the memory of another computer without involving either computer's operating system (OS). This permits high-throughput, low latency networking CPU load and store transfers involve the CPU directly performing the data transfer operation itself which may reduce CPU throughput.

Compute nodes are powerful machines that can support multiple users running multiple applications. Although compute nodes can have very large amounts of system memory, their resources are not infinite and do need to be managed.

Virtual memory (VM) is a commonly used computer system technique that can be employed to manage the memory requirements of multiple applications, multiple users and multiple processes. In a paged virtual memory system, areas of an application program's virtual memory space are divided in "pages" which are typically 4 k bytes in size. These virtual pages are mapped into the physical system memory (according to various schemes) for access by the application. Virtual pages may be stored in secondary storage (e.g. the computer system's hard disc) when not in use. The virtual address to physical address mapping may be performed with the use of a data structure called a page table (also referenced herein as a page translation table) which stores the mappings for virtual pages that are currently placed in physical memory. Page tables are typically managed by the operating system. A computer system may operate with multiple page tables, for example, each process may have a corresponding page table.

The dynamic translation of virtual memory address to physical memory addresses may be performed in hardware by a memory management unit (MMU). To speed up the translation, the MMU often includes a special cache called a translation lookaside buffer (TLB). The TLB is typically implemented as a content addressable memory and holds recently used page table mappings. Both the MMU and the TLB are configured and controlled by privileged software such as the OS.

Most virtual memory systems have memory areas that are "pinned down", i.e. cannot be swapped out to secondary storage. For example, interrupt vector tables are normally stored in pinned memory. If the vector tables were stored in paged RAM, interrupt-handling would become even more complex and time-consuming. The operating system keeps track of such pinning memory areas through a process of registration.

Buffer memory for RDMA and zero copy messaging is also registered and pinned at a server node so that it is available for access from the network adapter (NA). Registration and pinning are required because NAs today do not support demand paged memory and work in a different virtual address space from the CPU. Zero copy messaging broadly refers to moving incoming network data directly into the target application buffer without intermediate copies from, e.g., a buffer in kernel space to the application buffer.

When a DMA request is issued by the NA it is to the physical address or a virtual address that is specific to the adapter, and the accessed page needs to be resident in memory. The overhead of registration and pinning is high since it requires OS involvement and in many cases this overhead negates most of the gain of performing an RDMA or zero copy messaging transfer.

Attempts to reduce the cost of these operations include caching registrations, but the code complexity of managing registration caches is high, and the performance benefit is limited. In addition, managing the multitude of registrations when large remote areas are mapped is complex and adds to overhead.

SUMMARY OF THE INVENTION

A networking system may include compute nodes and network adapters coupled to the compute nodes, with the network adapters (NA) performing direct memory access (DMA) transactions to system memory on various ones of the compute nodes. The operating system (OS) running on the compute node may support virtual memory, and the compute node may include a central processing unit (CPU) incorporating a memory management unit (MMU) performing virtual to physical address translations. In paged virtual memory schemes, address translation may be performed with page translation tables held in memory. Together, the CPU, OS and MMU may operate to manage system memory on the compute node, which includes updating page translation tables and moving pages between system memory and secondary storage, in a paged virtual memory system. These updates may be problematic for devices, such as NAs, that read from and write to system memory. Some of these problems may arise, for example, when a translation update occurs during a sequence of NA accesses, and the update would affect the accessed locations.

In one set of embodiments, privileged software, e.g. the OS, may associate the source of various translation requests with a context. A context may define an independent address space or it may roughly correspond to OS processes. The source of the translation requests may be a process, or transaction(s) generated by a process, such as a data transfer process, a network transmitting process, a software application or an Infiniband queue-pair, to cite a few examples. For each context, the privileged software may generate an entry in a context definition table (CDT). Each context entry may describe broad aspects of the address translation used for associated requests. For example, the context entry may contain a pointer to a page translation table and other fields specifying the type of translation to be performed, access permissions and page size (associated with the corresponding page table). The translation-type field may indicate that no address translation is to be carried out, or it may indicate that paged translations are to be performed. In case of paged translations, it may be beneficial for translations to be compatible with the translations performed by a CPU (in association with the OS) on the compute node. In at least some embodiments, address translations may be performed using page translation information, such as a page table that is shared with compute node CPU (and OS). Once the contexts have been defined (entries made in the CDT) and the sources have been associated with the contexts, DMA requests may be generated and processed. Each DMA request may be associated with an address translation request, and the address translation requests may be queued for processing. It is noted that when the NA uses CPU pages tables, the software process executing on the compute node and the NA may use the same virtual address space.

An exemplary device (e.g. a NA) may fetch address translation requests from a pre-translation queue and may process each request using an associated context entry. In one embodiment, in addition to containing an address to be translated, each translation request also contains information that allows the NA to identify a corresponding entry in the CDT, which facilitates performing the address translation using the information provided in the identified context entry. When the NA shares page translation information with the OS on the compute node, to perform a translation update the OS may send a synchronization request to the NA. The synchronization request may contain fields that describe the associated context, the affected page address (e.g. if the update is limited to a page), and control bits indicating to the NA whether the entire context or just the affected page are to be synchronized. In other words, the synchronization command may define a category of requests (e.g. a first category) associated with the synchronization, through these fields. In response to the synchronization request, the NA may stop fetching requests that fall into this (first) category; while continuing to fetch requests that do not fall into the first category. In addition, the NA may continue to process all requests that it has fetched and is fetching, including requests of the first category.

At some point, each DMA transaction associated with all the fetched first category requests may complete, and the NA may indicate this as a completion status to the CPU. Indication of the completion status, (which may be in the form of a status register update) may be indicative of the synchronization request having been serviced. In response to receiving the completion status (e.g. the CPU detecting that the status register has been updated by reading the updated status register) the CPU may update the translation information. Once the update has been performed, the CPU may send an indication to the NA that the translation information has been updated. In one set of embodiments, the CPU may indicate that the update has been completed by clearing the synchronization request. In response to this notification, the NA may resume fetching address translation requests of the first category. When processing the newly fetched address translation requests, the NA may use the updated version of the translation information.

In one set of embodiments, a method for processing address translations may include fetching a first address translation request, and performing a first address translation in response to the first address translation request, using first translation information. The method may further include receiving a synchronization request, and in response to having received the synchronization request, indicating that a transaction associated with the first address translation request has completed (once the transaction has completed). The first translation information may then be updated in response to the indication that the transaction has completed. The method may also include indicating that the updating has been performed, fetching a second address translation request, and performing a second address translation in response to the second address translation request, using the updated first translation information.

Fetching address translation requests that belong to a first category (of address translation requests) may be suspended in response to receiving the synchronization request, while fetching address translation requests that belong to the first category may be resumed in response to the indication that the updating has been performed. In one set of embodiments, the synchronization request may include information used to specify the first category of address translation requests. The first category (of address translation requests) may correspond to a first portion of a group of address translation requests, with the group of address translation requests including address translation requests associated with a specific data transfer process, a specific transmitting process, a specific application, or a specific Infiniband queue-pair. The first portion of the group of address translation requests may include either all address translation requests specified by the group, or all address translation requests that are specified by the group and fall within a specific range of addresses.

In one embodiment, as part of the first address translation, a page translation structure may be searched (or traversed) for first page translation data corresponding to the first address translation request. If it is determined that the first page translation data cannot be found, an interrupt signal may be generated (e.g. by the NA). Upon receiving the interrupt signal (e.g. the CPU receiving the interrupt signal), the page may be loaded from secondary storage, and the first page translation data may be placed (i.e. inserted or added) in the page translation structure. The first page translation data may be used to complete the first address translation.

In one set of embodiments, a method may include fetching one or more translation requests corresponding to respective one or more transactions, and performing one or more translations, respectively corresponding to the one or more translation requests, using first translation information. Upon receiving a synchronization request for a first category of translation requests, specific translations of the one or more translations may be completed, where each of the specific translations corresponds to translation requests of the first category. The completion of specific transactions of the respective one or more transactions may be indicated, where the specific transactions correspond to translation requests that fall into the first category. The method may further include updating the first translation information in response to the indication that the specific transactions have completed, and indicating that the updating of the first translation information has been performed. Additional one or more translation requests of the first category may be fetched in response to the indication that the updating has been performed, and additional one or more translations respectively corresponding to the additional one or more translation requests may be performed using the updated first translation information.

In one embodiment, a system may include a device for facilitating address translation. The device may include a queue for storing address translation requests associated with respective transactions, a table for storing address translation information, one or more synchronization registers for storing synchronization requests, and one or more status registers for storing status information respectively corresponding to the synchronization requests. The device may fetch address translation requests from the queue, translate addresses corresponding to the fetched address translation requests using corresponding translation information from the table, process transactions corresponding to the fetched address translation requests using the translated addresses, and may detect when a synchronization request for a first category of address translation requests is stored in the one or more synchronization registers. In response to detecting that the synchronization request has been stored, the device may set one of the one or more status registers, once transactions corresponding to fetched address translation requests of the first category have completed, to indicate that the synchronization request has been serviced.

The device may also suspend fetching address translation requests of the first category, in response to detecting that the synchronizations request has been stored, detect when the synchronization request has been cleared from the one or more synchronization registers, and may resume fetching address translation requests of the first category, in response to detecting that the synchronization request has been cleared. The system may also include a compute node coupled to the device, with the device interfacing the compute node to a network. In one set of embodiments, the compute node may store the synchronization request in the one or more synchronization registers, read the one or more status registers, and may clear the synchronization request from the one or more synchronization registers.

BRIEF DESCRIPTION OF THE DRAWINGS

A better understanding of embodiments of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The terms "include", "comprise" and derivations thereof, mean "including, but not limited to". The term "coupled" means "directly or indirectly connected".

DETAILED DESCRIPTION OF THE EMBODIMENTS

Definitions

Compute Node—refers to a computer system having a processor (or CPU) and memory. A Compute Node may have a single processor (which may be single core or multi-core) or may have a plurality of processors. One example of a Compute Node is a blade server.

Local Node—refers to the Compute Node corresponding to a local reference. For example, the Compute Node associated with a particular CPU would be the CPU's Local Node.

Network Fabric—refers to a network or interconnect for connecting multiple Compute Nodes.

Compute Node Interface Device (or "Network Adaptor")—refers to an interface for coupling a Compute Node to a Network (or Network Fabric).

Remote Location—refers to a location on another machine on a network.

Figure 1:
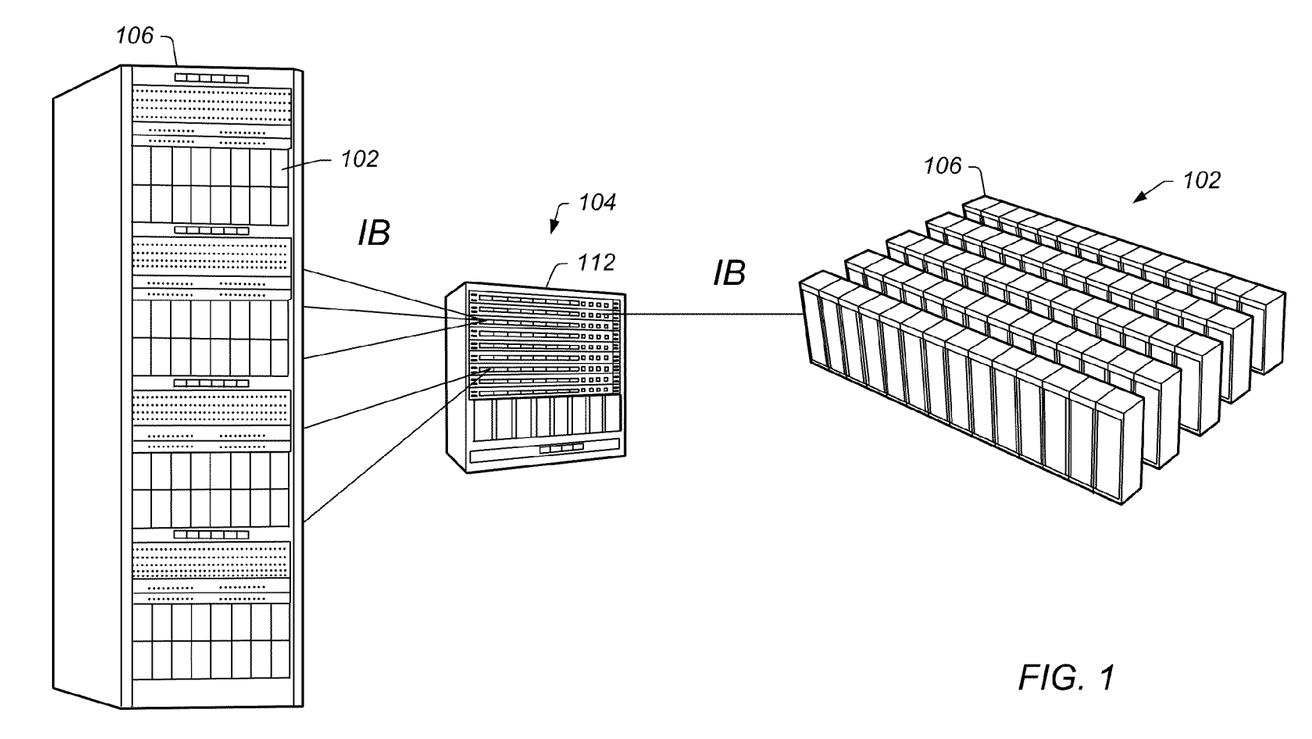
FIG. 1 illustrates an exemplary cluster according to one embodiment of the invention.

FIG. 1 illustrates an exemplary cluster system according to one embodiment of the invention. As shown, the system may include a plurality of computer systems or compute nodes 102 that are connected together by an interconnect 104. The compute nodes 102 may take various forms. In the embodiment of FIG. 1, the compute nodes 102 include blade servers that are housed in one or more racks 106. The interconnect 104 may include a fabric switch 112 as shown. The interconnect 104 may support only a single protocol, or may support a plurality of protocols. In the exemplary embodiment shown, the interconnect 104 may support the Infiniband (IB) protocol.

With reference to exemplary FIG. 1, the cluster includes one or more racks 106 each comprising 4 blade server chassis' which each include a plurality of blade servers (compute nodes) 102. The blade servers 102 connect to the fabric switch 112 through Infiniband. In one embodiment, the blade servers 102 connect to the fabric switch 112 over Infiniband. As shown, the fabric switch 112 may couple to additional racks 106 having additional compute nodes 102.

Each of the compute nodes 102 may couple to (or include) a compute node interface device, also referred to herein as a "Network Adaptor" or Scalable Interface (SIF), (110 FIG. 2) which provides an interface for the respective compute nodes 102. The compute node interface device or SIF 110 couples to a respective compute node 102 and provides an IB interface for the compute node 102 to the fabric 104, e.g., to the fabric switch 112. The compute node interface device 110 is mostly referred to herein as a "Network Adaptor" for the sake of convenience.

Figure 2:
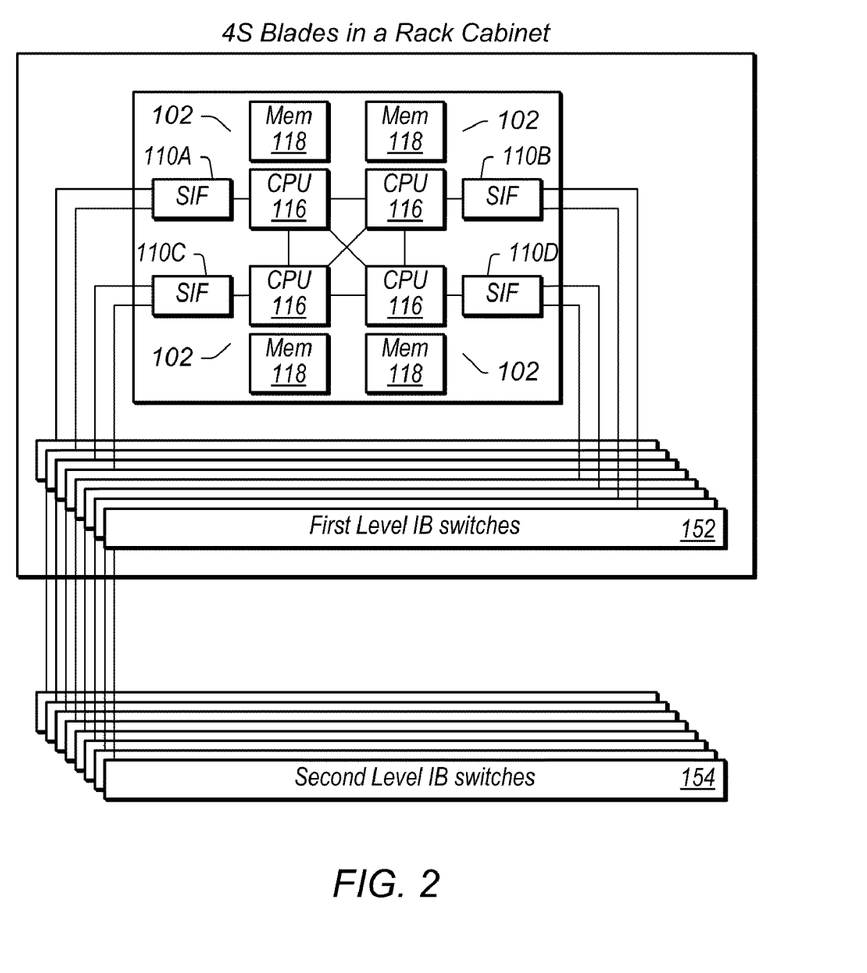
FIG. 2 is a block diagram of a portion of the cluster of FIG. 1, showing an exemplary compute node (4 server blade) connected to several levels of switches.

FIG. 2 is a block diagram illustrating a portion of a cluster system comprising an exemplary server blade (compute node 102) connected to form the cluster. Each compute node 102 includes a CPU 116 and a system memory 118. Each compute node 102 also couples to a corresponding Scalable Interface (SIF) block (compute node interface device) 110 (labeled as 110A-110D). Each compute node 102 couples to its respective Scalable Interface (SIF) 110A-D also located on the blade server. The SIF blocks 110 (110A-110D) each provide an Infiniband interface to a respective compute node 102. The SIF blocks 110 (110A-110D) each include a host interface for coupling to the host bus or processor bus of its respective compute node 102, as well as an Infiniband interface. The SIF block 110 is discussed in more detail with respect to FIG. 3.

Each of the SIF blocks 110 (110A-110D) may couple to Infiniband switches 152, referred to in FIG. 2 as First Level IB switches 152. The First Level IB switches 152 in turn may couple to Second Level IB switches 154. The First Level IB switches 152 may couple to the Second Level IB switches 154 through cables, as shown. There may be additional levels of IB switches.

Figure 3:
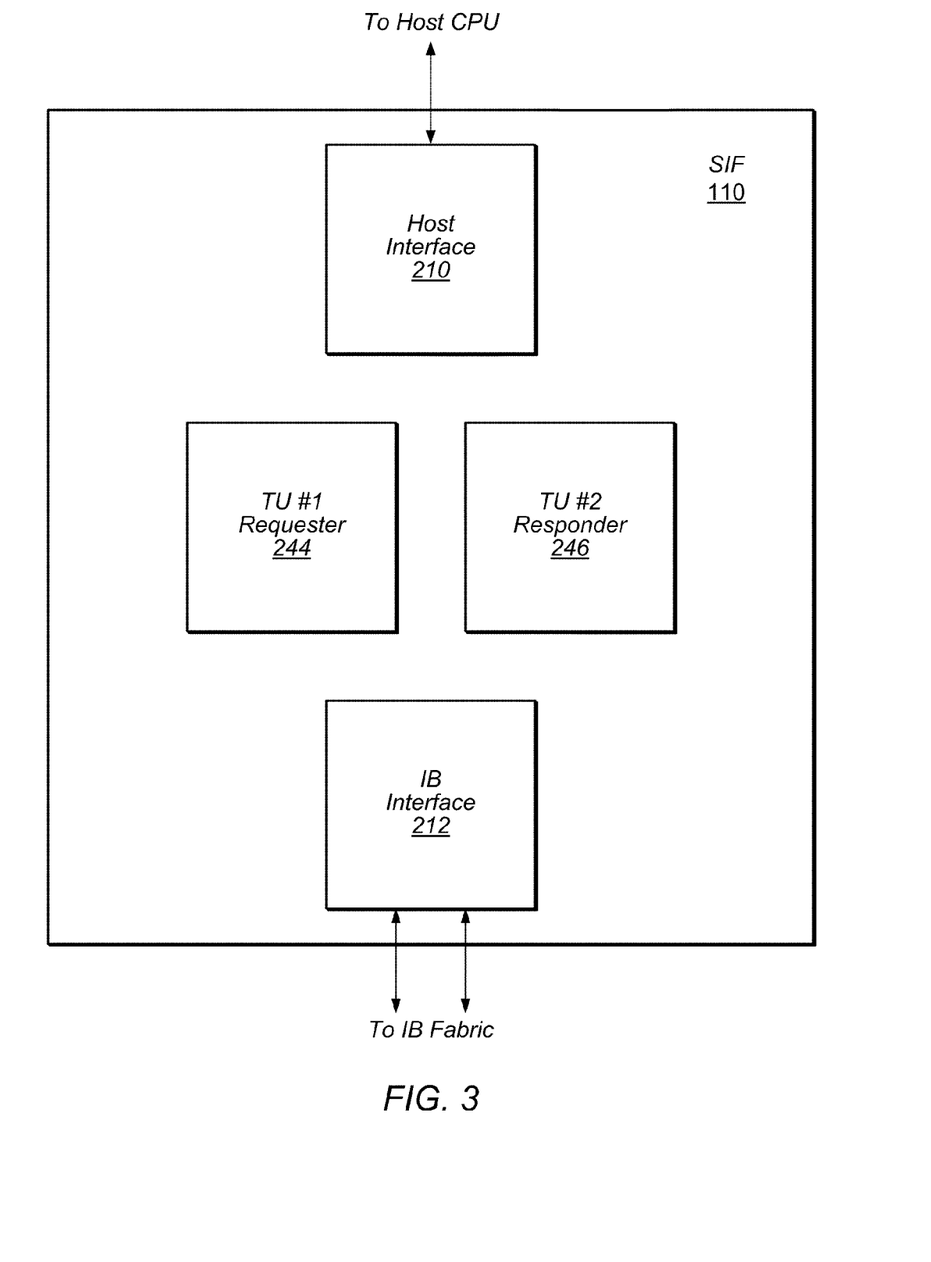
FIG. 3 is a block diagram of an exemplary scalable interface (SIF) used in interconnecting the various compute nodes in the cluster of FIG. 1.

FIG. 3 is a block diagram of an exemplary Scalable Interface (SIF) block (compute node interface device) 110. The SIF network adapter 110 operates as an interface or I/O adapter for each compute node 102 in the cluster. In one embodiment, the SIF 110 does not include a general purpose CPU and does not execute an operating system, and hence is a hardware-centric structure. The SIF 110 provides various services in hardware that would normally require software execution.

As shown, the SIF block 110 includes a host bus interface 210 for coupling to a computer system, e.g., in blade server 102. The SIF block 110 also includes a network fabric interface such as Infiniband interface 212, for coupling to Infiniband, e.g., for coupling to the network fabric 104.

The exemplary SIF block 110 may include a TU #1 (Transaction Unit) Requestor block 244 and TU #2 Responder block 246. The TU #1 Requestor block 244 generates/processes requests that are provided to other computer systems. The TU #2 Responder block 246 is responsible for responding to incoming packets, e.g., incoming send requests from other compute nodes 102. The TU #1 Requestor block 244 and the TU #2 Responder block 246 may each couple to the host bus interface 210 and the IB interface 212.

TU #1 244 may be the Requester TU. All requests sent by SIF 110 go through one of the TUs. SIF 110 may support the Infiniband (IB) reliable communication protocol, where every request may be properly acknowledged by the receiver before the request is completed at the sender. SIF 110 may support multiple command registers for applications to deposit commands—each command register typically dedicated to a host process running on a CPU. As the deposited commands are kicked off with doorbells, the commands merge into a stream of commands that then feeds into the TU scheduler which schedules them onto available threads/command-slots on the 64 thread engine. A doorbell is a write issued by software running on a CPU to an address mapped to a device (such as a network adapter) which causes the device to perform some action (such as sending a packet over the network fabric). Thus a doorbell is analogous to a house doorbell in the sense that it tells the device that some new action is needed.

TU #2 246 may be the Responder TU. All incoming requests are directed to the Responder TU (TU #2) 246 which processes the packet, ultimately delivering the packet to off-chip or on-chip memory or to other logic for processing collectives.

The SIF 110 may include transfer management circuitry which manages transfers as described herein. The transfer management circuitry may be coupled to the host interface 210 and the network interface 212. The transfer management circuitry may be included in one or more of the host interface 210, the TU #1 244 and/or the TU #2 246.

Pinned Pages

Embodiments of the invention allow a NA to access locations (e.g. buffers) in system memory that are not pinned or registered. Such embodiments may therefore support, for example, RDMA operations that use buffers located in unpinned memory. Achieving this involves finding solutions to the following two problems.

Firstly, providing access to CPU page tables in a flexible manner from the adapter. Multiple user processes might be accessing the NA concurrently and each could have a different page table or translation mechanism. The NA needs to be able to distinguish among DMA requests initiated on behalf of different user processes and employ the correct page table and translation mechanism.

Secondly, synchronizing adapter translations with the OS running on the host CPU when translations are altered by the OS. When the OS removes page table entries, or adds new page table entries, or modifies the page table structure in some manner concurrent accesses from the NA need to be disabled to prevent a stale (or incorrect) data access from the NA.

Figure 4:
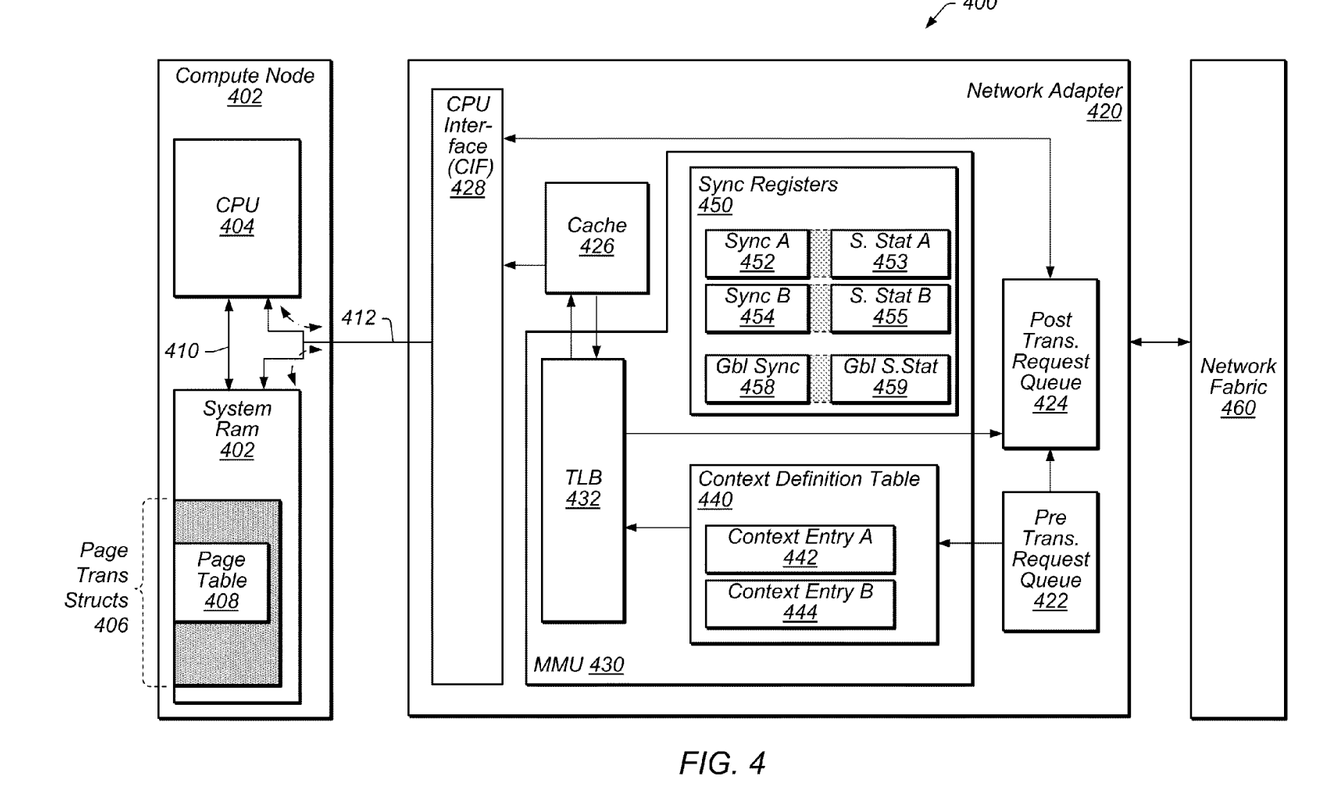
FIG. 4 is a block diagram showing a system according to one embodiment of the invention.

FIG. 4

FIG. 4 shows a block diagram of one embodiment of a system in which a network adapter may directly use CPU virtual addresses without requiring that pages in system memory remain fixed. The system 400 includes an exemplary device, e.g. NA 420 coupled to a compute node 402. The NA 420 is connected to a network fabric 460, which may be an Infiniband fabric. The NA 420 connects to the compute node 402, via a local communications bus 412. The communication bus 412 also allows the NA 420 to connect to System RAM 402 on the compute node 402. The CPU 404 on the compute node 402 also connects to System RAM 402, via bus 410. The System RAM 402 contains many different types of programming data including privileged software such as the OS for the compute node 402.

In FIG. 4 System RAM 402 contains a Page Translation Structure 406 (which may store address translation information) that may include multiple page tables, and within that structure 406, a Page Table 408 is shown. The CPU 404 (including built-in MMU), uses data held within 406 and 408 to perform virtual to physical address translation.

The NA 420 includes a number of function blocks including a CPU interface (CIF) 428 that connects the NA 420 to the local communications bus 412. Address translation requests from multiple sources, are processed through queues that can be divided into a Pre-Translation Request Queue 422 (from which address translation requests may be fetched within NA 420) and Post-Translation Request Queue 424 (in which transactions to which the address translation requests correspond may be stored). The NA 420 also contains a Cache 426 coupled to an exemplary MMU 430 which is shown in expanded detail.

In one set of embodiments, address translation requests may include an address to be translated, an identifier used to select the context entry for the translation request, as well as additional fields as required. The identifier may be used to distinguish among request sources, e.g., DMA requests, initiated on behalf of different user processes. This enables the employment of the correct page table and translation mechanism.

The MMU includes a context definition table (CDT) 440 (i.e. a table that may store context information) and synchronization registers block (SYNCR) 450. In addition to these structures, the MMU 430 further includes a TLB 432 that interfaces with Cache 426.

The CDT 440 includes a number of entries, where each entry corresponds to a specific context. A context roughly corresponds to an OS processes or thread. Each entity within the NA 420 that can independently initiate DMA reads or DMA writes to System RAM 402 may be assigned to a context. For example, an Infiniband Queue Pair could be viewed as an entity. Multiple entities may be assigned to the same context. All accesses from an entity to System RAM 402 are within the address space assigned to its context. In the embodiment shown in FIG. 4, the CDT 440 includes two context table entries, namely context entry A 442 and context entry B 444.

The SYNCR 450 includes pairs of synchronization registers. Each pair includes a synchronization register (which may store synchronization requests) and a synchronization status register (which may store information indicative of whether the synchronization request has been serviced or not). In the embodiment shown in FIG. 4, the SYNCR 450 includes three pairs of synchronization registers. The first pair of registers includes synchronization register A 452 and synchronization status register A 453, the second pair of registers includes synchronization register B 454 and synchronization status register B 455, and so on, and so forth. The final pair of registers includes a global synchronization register 458 and a global Synchronization Status register 459.

Each context may be associated with a respective synchronization register and a respective synchronization status register in SYNCR 450. In the embodiment shown, the pair of synchronization registers 452, 453 may correspond to the context described or defined by 442. Likewise, the pair of synchronization registers 454, 455 may correspond to the context described or defined by 444.

Figure 6:
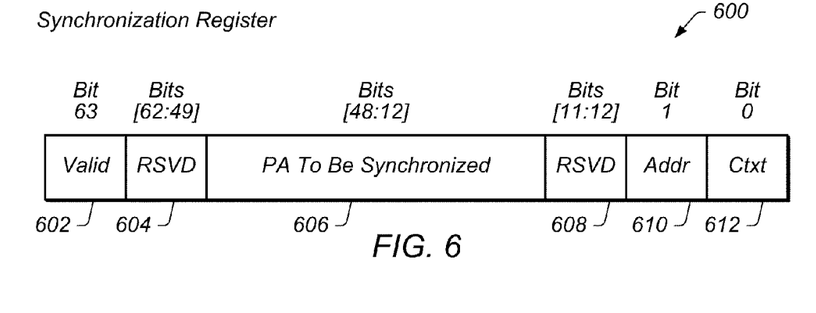
FIG. 6 illustrates an exemplary synchronization register.
Figure 7:
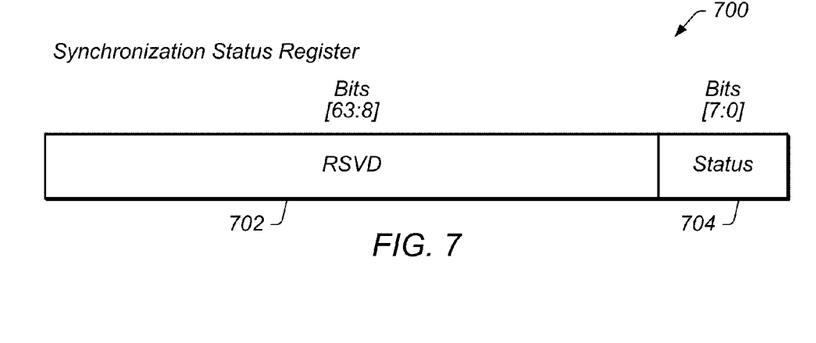
FIG. 7 illustrates an exemplary synchronization status register.

In one set of embodiments, the number of synchronization register pairs may be at least as great as the largest number of supported contexts. One embodiment of the synchronization register structure is shown in FIG. 6 and described below. One embodiment of the synchronization status register is shown in FIG. 7, and is further described below.

Note that although one page table 408 is shown, an operation is described with respect to this one page table, those skilled in the art will appreciate that the embodiments can support address translations that use multiple page tables.

Figure 5:
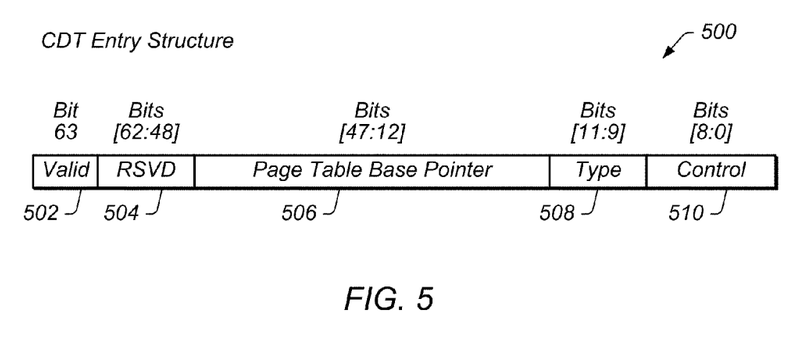
FIG. 5 illustrates an exemplary context definition table (CDT) entry.

FIG. 5

The CDT 440 includes a list of entries associated with contexts. Contexts may roughly correspond to OS processes and/or independent address spaces. Each entity within a NA that can independently initiate DMA reads or DMA writes to system memory may be assigned to a context. For example, an Infiniband Queue Pair may be considered an entity. Multiple entities may be assigned to the same context. In one set of embodiments, all system memory accesses from an entity may have to be within the address space assigned to its context.

The allocation and de-allocation of contexts may be managed by the OS. A number associated with a context may be used to index into the CDT 440 and select an entry.

FIG. 5 shows the structure of an exemplary CDT entry (i.e. a first context entry, which may hold context information used to perform address translation). The control field 510 may include a page size indicator. The CDT 440 may be accessible by software through programmed input/output (PIO). CDT 440 may be read and write accessible. The number of entries in the CDT 440 may be variable and may depend on the deployment scenario.

The exemplary CDT 440 entry structure 500 is now described in more detail. A Valid bit 502 simply defines the entry as being valid or invalid, depending on its value. An RSVD field 504 is reserved for future/other use. Bits 47 to 12 form the Page Table Base Pointer 506 which is a pointer to a page table (containing address translation information) in system memory (e.g. in system RAM 402). A type field 508 may be included to define the type of translation associated with the context. A first translation type may be defined as a CPU type translation to perform translations according to various embodiments (as described herein), while a second type may define a "bypass mode" that allows translation modes associated with legacy applications, enabling operating systems to continue to use legacy mechanisms. Finally, a control field 510 may be used to describe/define the page size and access permissions of translation table 408 in system memory 402. In one embodiment, control field 510 may be considered as essentially comprising two fields, a size field that indicates the page size associated with page table 408, and an access field that indicates access permissions associated with page table 408.

The CDT 440 entry structure 500 above is an example implementation. Other structures are possible. The CDT 440 may allow multiple user processes to concurrently use the NA 420 and use different page tables or even different translation mechanisms for performing address translations. By the use of the methods described herein, the NA is able to distinguish among DMA requests initiated on behalf of different user processes and employ the correct page table and translation mechanism.

FIG. 6

When pages accessed by the adapter (e.g. NA 420) are not required to remain fixed in system memory (e.g. 402), changes in mapping may occur while pages are being accessed by the NA 420. Software executed by CPU 404 may synchronize with NA 420 whenever CPU 404 intends to change the address translation information associated with a given context, in the page table. In one sense, synchronization may be performed to guard against erroneous memory accesses. Such an access may occur when a DMA access to a location in memory is initiated by NA 420, and the associated page in memory is de-allocated by the OS and reassigned to other data before the memory access completes. This may result in the DMA request accessing a page different from the targeted page. Performing synchronization may prevent this from happening.

Synchronization may be performed with the aid of synchronization registers 450. As previously mentioned, synchronization registers 450 may include a synchronization register and a synchronization status register. One embodiment of a synchronization register 600 is shown in FIG. 6, and one embodiment of synchronization status register 700 is shown in FIG. 7.

For synchronization register 600, a Valid bit 602 may be set by software (executing on CPU 404, for example) when synchronization is requested. Valid bit 602 may also be cleared by the software when the translation information associated with the synchronization request has been updated in page translation table 408. A context bit 612 may control the scope of the synchronization. When context bit 612 is set and address bit 610 is not set, the entire context defined by the context entry (e.g. by context entry 442 or context entry 444, etc.) may be synchronized. All non-bypass contexts may be synchronized when synchronization is requested using global synchronization register 458. When address bit 610 is set and context bit 612 is also set, only the page associated with the address translation request may be synchronized. In this embodiment, address bit 610 may be set in conjunction with setting context bit 612. Also, when synchronization register 600 is written, at least context bit 612 may be required to be set. Field 606 may define the page address to be synchronized, and may therefore provide the address of the page that is to be synchronized when address bit 610 is set. When address bit 610 is not set, the functionality of field 606 is reserved. Fields 604 and 608 may also be reserved.

FIG. 7

An embodiment of a synchronization status register 700 is shown in FIG. 7. As shown in FIG. 7, register 700 includes two fields. A reserved field 702 (bits 63 to 8) may be reserved for future use. Bits 7 to 0 may make up status field 704. In one embodiment, the status field coding is defined as follows. A first value (e.g. 0x0) may indicate "Inactive" status. A second value (e.g. 0x01) may indicate "synchronization pending". A third value (e.g. 0x02) may indicate "synchronization complete", i.e. that all outstanding transactions to the region of synchronization are complete. Other possible values of status field 704 may be reserved for future use.

Translation Operation

A translation operation and a synchronization operation will now be described in more detail. NA 420 may share with CPU 404, the use of the page translation structures 406 held in System RAM 402. When a context (e.g. a first context, e.g. context "A") is setup, the base address of an appropriate page table 408 along with control bits settings, may be written—in the form of an entry—by the operating system of the compute node 402 into CDT 440. For example, the OS may write an entry corresponding to context "A" into CDT 440 as context entry 442.

When the NA 420 performs a DMA access, an address translation request (corresponding to the DMA access) may be fetched by the NA's MMU 430 from request pipeline 422. To perform the address translation, MMU 430 may use a virtual address and a CDT 440 entry (e.g. entry 442) to lookup TLB 432. Note that both the virtual address and information used to select the CDT 440 entry may be obtained from the address translation request. On a hit in TLB 432, a corresponding translated address may be provided to the NA's Post-Translation Request Queue 424. On a miss in TLB 432, MMU 430 may use the page table base register written in the CDT 440 entry (in this example entry 442) to identify the location of the page table 408 in system RAM 402, and may send a DMA read request for the translation through the NA 420 Cache 426 to System RAM 402. Depending on the structure of the page table, multiple page table accesses might be required before the translated address is obtained. The translated address, once obtained, may be placed in TLB 432, and forwarded to queue 424. Not obtaining the translated address may indicate a page fault. In case of a page fault, an interrupt signal may be transmitted to CPU 404, (e.g. MMU 430 might send the interrupt signal to CPU 404) indicating a page fault and requesting further processing.

Other translation mechanisms are possible. For instance, in addition to the page tables in memory, a large translation cache (not shown) may be configured in system 400, for example in memory 402. In this type of embodiment CDT entry structure 500 may include a field storing a base address of the translation cache in addition to the base address of the page table (e.g. table 408), and TLB 432 lookup may be based on the target cache address of the incoming virtual address. On a hit the translated address may be provided to queue 424. On a miss in TLB 432, MMU 430 may perform a request. On a miss in TLB 432 and a miss in the translation cache, MMU 430 might initiate a page table access.

The logic to initiate access to TLB 432, page table 408, or the translation cache, may be implemented using logic gates, or it may be implemented in software on an embedded processor.

Therefore, embodiments of the invention may use CPU virtual addresses from the NA 110 through the notion of a CDT 440 that encapsulates CPU page table information for a context.

Synchronization Operation

Synchronization registers provide a mechanism for software (executed on CPU 404, for example) to request that NA 420 suspend fetching address translation requests of (or belonging to) a first category, where the first category may be defined as a specific address range associated with a context, or it may be defined as the entire context itself. When MMU 420 receives a synchronization request, it may suspend fetching further address translation requests of the first category. However, MMU 440 may complete all translation requests that are currently in progress, including translation requests of the first category.

In the embodiment shown in FIG. 4, there are two request queues. Queue 422 may store address translation requests (pre-translation queue), while queue 424 may store transaction requests associated with the address translation requests. Queue 424 may also store the translated addresses obtained as a result of servicing the address translation requests (post-translation queue) for the associated transactions. When NA 420 receives a synchronization request it may stop fetching translation requests of the first category from queue 422. NA 420 may monitor queue 424 and may determine when all transactions in queue 424 that are associated with translation requests of the first category are complete. A synchronization request may be made by CPU 404 writing to a synchronization register (e.g. 452, 454) associated with a context entry (e.g. context 422, 444). Once all transactions associated with translation requests of the first category are complete, NA 420 may set a corresponding synchronization status register (e.g. 453, 455) to indicate that those transactions are complete. NA 420 may not fetch additional address translation requests of the first category until the software indicates that the update of the translation information in page table 408 has been completed.

In other words, when software (executing on CPU 404, for example) wishes to synchronize a context or an address, it may write to an appropriate synchronization register (e.g. register 452). After writing to synchronization register 452, the software may poll (i.e. may periodically read) a synchronization status register (e.g. 453) corresponding to the synchronization register. When the synchronization status register (e.g. 453) is set by NA 420 to indicate that synchronization is complete, the software may perform the translation update, and may inform NA 420 that the update is complete, by writing a different value in the synchronization register (e.g. 452). The NA 420 may then return to normal processing of DMA requests, upon detecting that the different value is now present in the synchronization register (e.g. 452). DMA requests that are not associated with the context or address being synchronized may not need to be blocked during synchronization.

Figure 8:
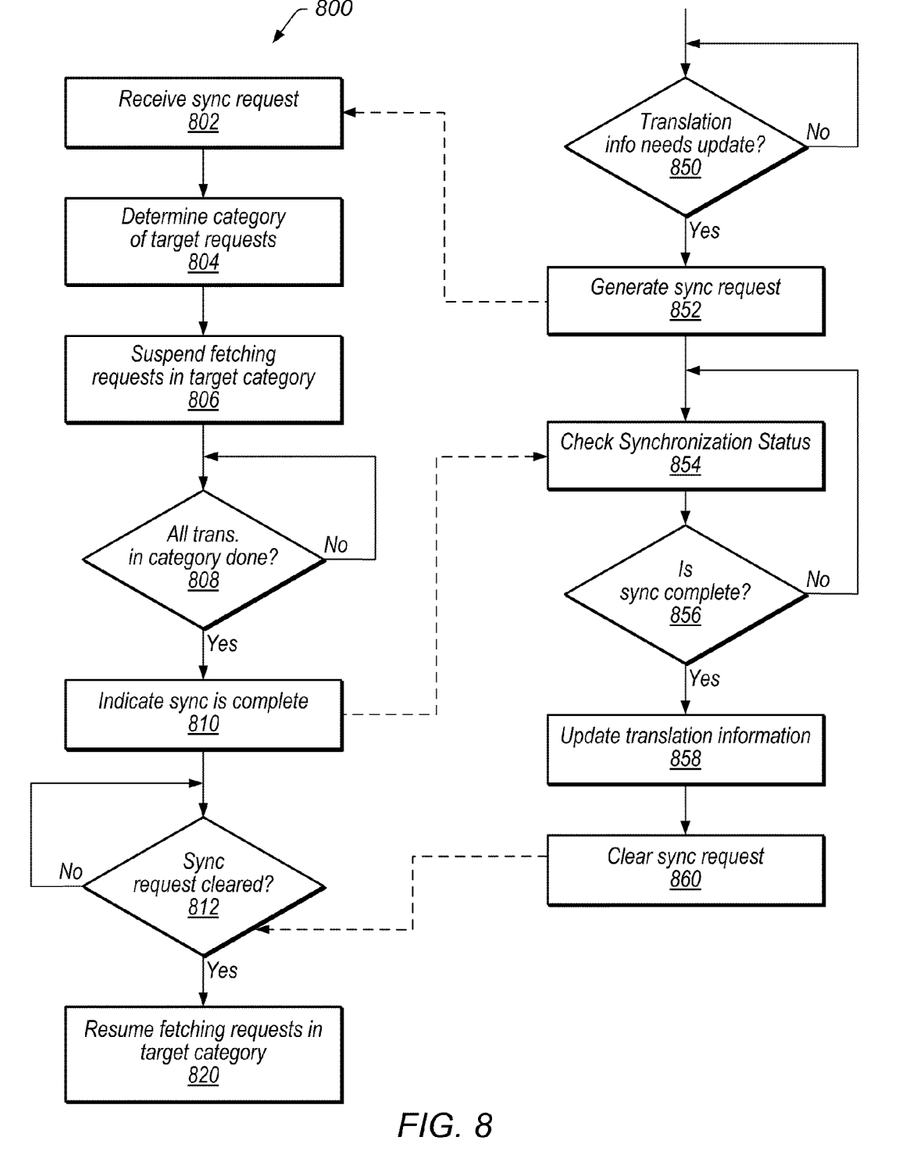
FIG. 8 is a flow chart illustrating the behavior of one embodiment of the system.

FIG. 8

FIG. 8 is a flowchart illustrating one embodiment of a synchronization operation. The flowchart shows behavior of both a CPU (e.g. CPU 404) and an exemplary device (e.g. NA 420) involved in performing address translations. Both of these devices may share address translation information (e.g. page translation structure 406).

Software (e.g. the OS) running on the CPU 404 may determine that address translation information (e.g. in page table 408) needs to be updated (in 850). Prior to performing the update, CPU 404 may issue a synchronization request to NA 420, by writing to a specific synchronization register (e.g. 452) associated with a given context (in 852). CPU 404 may then wait (and may perform other activities as required) until it determines that the requested synchronization is complete (in 856). CPU 404 may determine whether the requested synchronization is complete by reading status register 453 corresponding to the synchronization register 452 that was used in the issued request (in 854).

NA 420 may receive the synchronization request (in 802), which may also be interpreted as CPU having written synchronization register 452 (in 852). NA 420 may determine, from the contents of synchronization register 452, the category of addresses involved in the synchronization (in 804). This target category (or first category) may be either (a) all translation requests associated with the given context or (b) translation requests with address values that fall into a supplied page address range. NA 420 may respond to the synchronization request by suspending the fetching of translation requests in the target category (in 806). However, the translation requests in the target category that have already been fetched may be processed by NA 420, and these translated addresses may be used by NA 420 to perform transactions.

Once all the transactions (e.g. data movements, memory accesses) associated with the target category have completed (in 808), NA 420 may indicate to the CPU 404 that the synchronization is complete (in 810), for example, by updating the appropriate synchronization status register 453. NA 420 may resume fetching non target category translation requests and process them while it waits for the synchronization request to be cleared (in 812).

After CPU 404 reads the updated synchronization status register (in 854), it may then determine that the issued synchronization request is complete (in 856). CPU 404 may then perform the translation updates (in 858). Once the translation information has been updated, CPU 404 may notify NA 420 that the translation information has been updated (in 860), for example, by writing again to the same synchronization register 452 (e.g. clearing the synchronization request). In response to the synchronization register having been updated by CPU 404, NA 420 may resume fetching requests of the target category (in 820).

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for processing address translations, the method comprising:
fetching a first address translation request, and performing a first address translation in response to the first address translation request, using first translation information;
receiving a synchronization request; indicating, in response to said receiving the synchronization request, that a transaction associated with the first address translation request has completed, once the transaction has completed;
updating the first translation information in response to said indicating that the transaction has completed;
indicating that said updating has been performed; and
fetching a second address translation request, and performing a second address translation in response to the second address translation request, using the updated first translation information,
wherein one or more of said performing the first address translation and said performing the second address translation are performed by circuitry comprised in a network adapter.

2. The method of claim 1, further comprising: in response to said receiving the synchronization request, suspending fetching address translation requests that belong to a first category of address translation requests.

3. The method of claim 2, further comprising: in response to said indicating that said updating has been performed, resuming fetching of address translation requests that belong to the first category of address translation requests.

4. The method of claim 2, wherein the synchronization request comprises information used to specify the first category of address translation requests.

5. The method of claim 2, further comprising: fetching a third address translation request subsequent to said suspending, performing, prior to said updating, a third address translation in response to the third address translation request, using second translation information.

6. The method of claim 2, wherein the first category of address translation requests corresponds to a first portion of a group of address translation requests; wherein the group of address translation requests comprises address translation requests associated with one or more of: a specific data transfer process; a specific transmitting process; a specific application; or a specific Infiniband queue-pair; wherein the first portion comprises one of: all address translation requests specified by the group; or all address translation requests that are specified by the group, and fall within a specific range of addresses.

7. The method of claim 1, wherein the first address translation request comprises: a first address to be translated; and first identifier used to select a first context entry; wherein the first context entry comprises context information used to perform address translation; and wherein said performing the first address translation comprises: selecting the first context entry according to the first identifier; and translating the first address to be translated, according to the context information.

8. The method of claim 7, wherein the second address translation request comprises: a second address to be translated; and second identifier used to select the first context entry; and wherein said performing the second address translation comprises: selecting the first context entry according to the second identifier; and translating the second address to be translated, according to the context information.

9. The method of claim 7, wherein the context information comprises one or more of: a pointer to a page translation table that contains the first translation information; a type field that indicates the type of translation to be performed; a size field that indicates the page size associated with the page translation table; and an access field that indicates access permissions associated with the page translation table.

10. The method of claim 9, wherein the type field indicates one of: address translation is not to be performed for the first context entry; or paged translations are to be performed for the first context entry.

11. The method of claim 1, wherein said performing the first address translation comprises: searching a page translation structure for the first translation information; determining that the page translation structure does not comprise the first translation information; generating an interrupt signal in response to said determining; receiving the interrupt signal, and in response to said receiving the interrupt signal: loading the associate page from the secondary storage; and placing the first translation information in the page translation structure.

12. A method for processing address translations, comprising:
- fetching translation requests corresponding to respective transactions;
- performing one or more translations respectively corresponding to the one or more translation requests, using first translation information;
- receiving a synchronization request, wherein the synchronization request is for a first category of translation requests;
- completing performing specific translations of the one or more translations, wherein each of the specific translations corresponds to translation requests of the first category;
- indicating that specific transactions of the respective one or more transactions have completed, wherein the specific transactions correspond to translation requests of the first category;
- updating the first translation information in response to said indicating that the specific transactions have completed;
- indicating that said updating has been performed;
- fetching additional one or more translation requests of the first category in response to said indicating that said updating has been performed; and
- performing additional one or more translations respectively corresponding to the additional one or more translation requests, using the updated first translation information, wherein said performing address translation is performed by circuitry comprised in a network adapter.

13. The method of claim 12, further comprising in response to said receiving the synchronization request, suspending fetching translation requests of the first category.

14. The method of claim 12, wherein the first category is comprised in a context, wherein the context corresponds to one or more of: one or more independent address spaces; one or more Infiniband queue pairs; one or more operating system processes; one or more local data transfer processes; or one or more network transfer processes.

15. A network adapter device, comprising:
- a queue configured to store address translation requests associated with respective transactions;
- a table configured to store context information; one or more synchronization registers configured to store synchronization requests; and
- one or more status registers configured to store status information respectively corresponding to the synchronization requests;
- wherein the network adapter device is configured to:
- fetch address translation requests from the queue;
- translate addresses associated with the fetched address translation requests, using corresponding context information from the table;
- process transactions corresponding to the fetched address translation requests, using the translated addresses;
- detect when a synchronization request for a first category of address translation requests is stored in the one or more synchronization registers;
- in response to detecting that the synchronization request has been stored, set one of the one or more status registers once transactions corresponding to fetched address translation requests of the first category have completed, to indicate that the synchronization request has been serviced.

16. The device of claim 15, wherein the device is further configured to suspend fetching address translation requests of the first category, in response to detecting that the synchronizations request has been stored.

17. The device of claim 16, wherein the device is further configured to: detect when the synchronization request has been cleared from the one or more synchronization registers; and resume fetching address translation requests of the first category, in response to detecting that the synchronization request has been cleared.

18. The device of claim 15, wherein the device is a compute node interface device; wherein the compute node interface device is configured to couple to a compute node; wherein the compute node interface device is further configured to interface to a network.

19. The device of claim 18, wherein the device is in a system comprising the device and a compute node coupled to the device; wherein the compute node is configured to: store the synchronization request in the one or more synchronization registers; read the one or more status registers; and clear the synchronization request from the one or more synchronization registers.

* * * * *